United States Patent [19]

Kosek

[11] 4,342,428
[45] Aug. 3, 1982

[54] POWDERED COAL DELIVERY SYSTEM

[75] Inventor: Thomas P. Kosek, East Detroit, Mich.

[73] Assignee: General Motors Corporation, Detroit, Mich.

[21] Appl. No.: 184,537

[22] Filed: Sep. 5, 1980

[51] Int. Cl.³ .............................................. F02G 45/00
[52] U.S. Cl. ..................................... 239/651; 123/23; 60/39.46 S
[58] Field of Search .................. 239/651; 60/39.46 S, 60/39.47, 39.49, 39.46 M, 595; 123/23

[56] References Cited

U.S. PATENT DOCUMENTS

| | | | |
|---|---|---|---|
| 2,509,246 | 5/1950 | Ramsey | 123/23 |
| 2,651,176 | 9/1953 | Yellott | 60/39.46 |
| 2,652,687 | 9/1953 | Yellott | 60/39.46 S |
| 2,923,575 | 2/1960 | Allen | 302/55 |

OTHER PUBLICATIONS

Proceeding of the Conference on Coal Feeding Systems, U.S. Dept. of Comm., N 78-13241-13270, Jun. 23, 1977.

Primary Examiner—James B. Marbert
Attorney, Agent, or Firm—J. C. Evans

[57] ABSTRACT

A dry coal fuel supply system for a gas turbine engine includes a continuous loop conveyor pump having a plurality of positive displacement pistons connected by a cable and driven by a variable speed motor with respect to an atmospheric reservoir filled with powdered coal and the continuous loop includes a dual stage coal pick-up for assuring coal fill of the conveyor system to accurately meter coal therefrom in accordance with the speed of the variable drive motor for driving the conveyor and wherein the system includes an improved sealed discharge manifold means for directing a controlled amount of the compressor discharge air of the gas turbine engine to a plurality of air jets for blasting high pressure air across the coal pump pistons to direct a fluidized powdered coal mixture into a downstream, closely associated fuel nozzle system for a gas turbine engine combustor.

2 Claims, 11 Drawing Figures

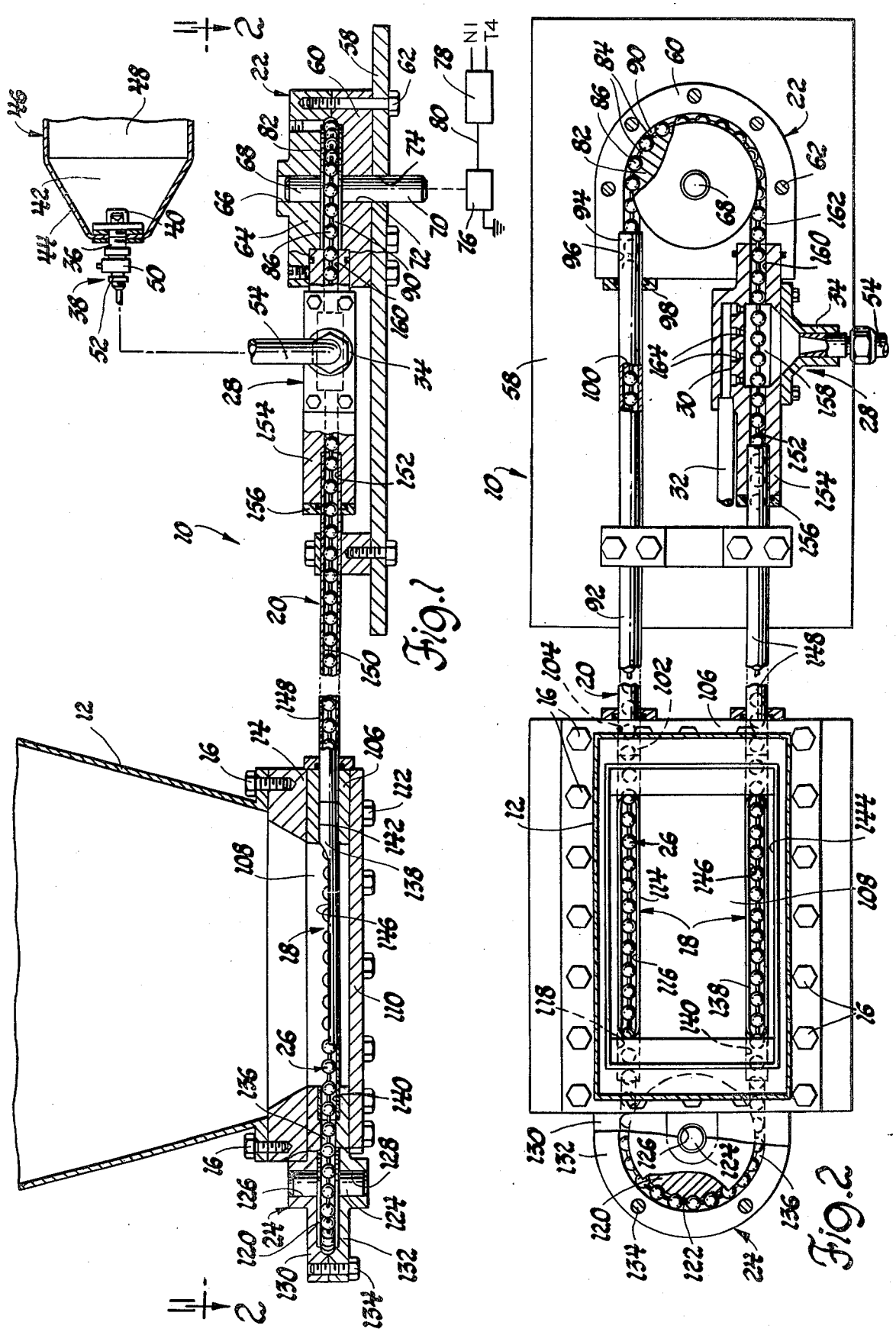

POWDERED COAL DELIVERY SYSTEM

This invention relates to dry coal feed systems and more particularly to dry coal feed systems for directing powdered coal into the combustion chamber of gas turbine engine combustor apparatus.

Linear pocket-type dry coal feeders have been proposed for use in industrial power plants for supplying metered amounts of coal into a combustion chamber. Such systems have included an enclosed tubular conveyor with tight clearances between piston elements on a continuously formed drive cable. The pistons and cable are directed over a variable speed drive sprocket and returned over an idler sprocket and are directed with respect to a coal feeder station to supply coal to the conveyor. Such systems have included an unloading section for directing the coal under gas pressure into a high pressure vessel for subsequent supply to the furnace of a power plant. Such systems are especially suitable for use in fixed capacity industrial power plants, and are normally operated at a rated power level that requires little or no change in the drive speed of the conveyor to meter the coal to a combustion chamber.

Accordingly, an object of the present invention is to provide an improved dry coal pocket feeder for directing powdered coal particles to supply wide ranges of fuel input in accordance with the load demand of a road vehicle and to do so by means that will assure a positive fill of a continuous cable and piston at low and high rates of fuel supply to meet vehicle road load demands.

Still another object of the present invention is to provide an improved dry coal fuel supply system for a gas turbine engine including a continuously formed continuous loop conveyor having coal pumping pistons thereon connected by drive cable and operative to pass through coal dust sealed transfer tubes between a coal supply station maintained under atmospheric conditions and a coal discharge manifold having engine gasifier compressor air directed therethrough to discharge coal from the cable and wherein fuel is metered under the control of a variable speed motor connected to a drive sprocket in operative engagement with the continuous conveyor and wherein means are provided to produce a dual phase fill of portions of the conveyor from the coal supply station so as to assure full fill of pump cavities between the pistons of the conveyor throughout a wide range of fuel supply rates to a combustion chamber for the gas turbine engine fueled by the dry coal combustible material.

Yet another object of the present invention is to provide an improved dry coal fuel supply system to direct fluidized coal to a fuel nozzle in a gas turbine engine combustor including a coal supply reservoir maintained at atmospheric pressure and having an outlet hopper therefrom with spaced parallel walls each having a coal transfer trough therein opened to the hopper and wherein a drive sprocket means and driven sprocket means are located on opposite sides of the hopper and interconnected by coal dust tight transfer tubes having a continuously formed pumping conveyor with pistons therein and interconnecting cable means directed through the troughs, transfer tubes and drive sprocket and driven sprocket means and driven at variable speeds through the troughs to pick up coal from the hopper at a first pass on one side of the driven sprocket and at a second trough on the outlet of the driven sprocket to assure complete fill of spaces between the pumping pistons with powdered coal during operation of the conveyor system through a wide range of fuel flow rates to the combustion apparatus to meet a wide range of vehicle load conditions during vehicle operation.

Further objects and advantages of the present invention will be apparent from the following description, reference being had to the accompanying drawings wherein a preferred embodiment of the present invention is clearly shown.

FIG. 1 is a view in vertical section through a powdered coal pump and metering assembly;

FIG. 2 is a sectional view taken along the line 2—2 of FIG. 1 with portions of sprocket assemblies therein broken away and sectioned;

Figure 3:
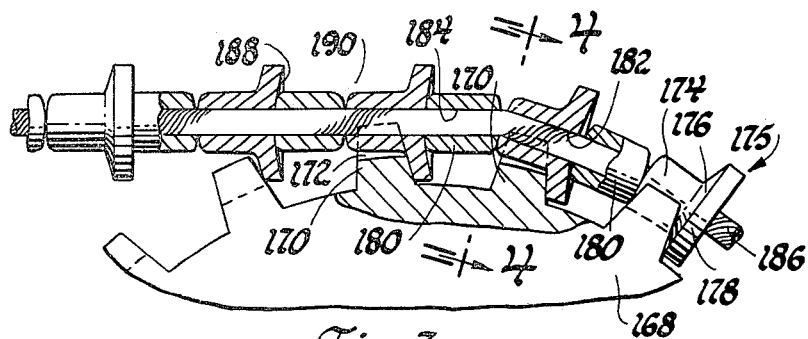
FIG. 3 is a fragmentary enlarged sectional view of a second embodiment of a cable and sprocket drive for use in the present invention.

Referring now to FIG. 1, a powdered coal distribution system 10 is illustrated including a powdered coal hopper 12 containing finely ground powdered coal in the range of from one to three hundred micron size. An outlet funnel 14 on the hopper 12 is connected thereto by screws 16. Funnel 14 feeds powdered coal to a dual fill inlet 18 of a continuous loop conveyor 20 with spaced apart drives 22, 24 for continuously driving a cable type conveyor 26 through the dual fill inlet 18 thence through a coal fluidizer 28 having an air/jet aerator 30 that directs pressurized air from an inlet tube 32 through the chain conveyor 26 so as to disperse powdered coal particles therefrom into a fluidized state for discharge through an outlet 34 of the coal fluidizer 28. Outlet 34 is in communication with the inlet port 36 of a powdered coal/air dispersion nozzle 38 that includes a discharge port 40 therefrom in communication with an interior space 42 defined by the domed end 44 of a combustor 46 for a gas turbine engine.

In accordance with the present invention, the powdered coal/air dispersion nozzle 38 is operative to introduce a spray cone of swirled coal and air into the space 42 which communicates with a primary combustion chamber 48 of a combustor 46 as a finely dispersed mixture of air and fuel which is readily combusted within the combustion chamber 48 during gas turbine engine operation.

The nozzle 38 includes an elongated body 50 with the inlet port 36 at one end thereof and the outlet port 40 at the opposite end thereof. The inlet port 36 threadably receives one end 52 of a connection tube 54 between the outlet 34 of the coal/air fluidizer 28 and the nozzle body 50. The connection tube 54 supplies fluidized coal with coal particles therein sized in the range of one to three hundred microns. A more detailed description of the nozzle 38 is set forth in copending United States patent application, Ser. No. 125,469, filed Feb. 28, 1980, to Kosel et al for Powdered Coal Air Dispersion Nozzle with an assignee common to the present case.

The continuous loop conveyor 20 more particularly includes a base plate 58 having a sprocket housing 60 secured thereto by a plurality of screws 62. A sprocket housing cover 64 is secured to the housing 60 by the screws 62. Cover 64 has a shaft bore 66 to receive one end 68 of a sprocket shaft 70 that extends through a bore 72 in the housing 60 and an aligned bore 74 in the plate 58 to be located exteriorly of the plate to be coupled to a drive mechanism 76 that is controlled to variable speeds in accordance with a controller 78 that is responsive to typical gas turbine engine control parameters such as gasifier speed N1, turbine inlet temperature T4 and the like.

The detailed components of the controller 78 and their mode of operation depend upon the type of gas turbine engine that has coal supplied to the combustor unit therein. The details do not form part of the present invention and it is only necessary to indicate that the controller 78 will produce an output on a signal line 80 to condition the variable speed drive mechanism 76 to vary the rate of rotation of the sprocket shaft 70 for controlling the advance of the conveyor 26. The drive sprocket 82 connected to the shaft 70 has a plurality of circumferentially spaced teeth 84 thereon that pick up spaced apart pump piston elements 86 on the conveyor 26. In the embodiment of FIGS. 1 and 2, the pump pistons 86 are illustrated as balls having interconnecting chain links to define coal carrying spaces 90 throughout the length of the conveyor 26. The conveyor 26 passes around the outer circumference of the drive sprocket 82 as seen in FIG. 2 and extends through a return tube 92 having an inlet end 94 thereon fit within a bore 96 at one end of the housing base 60 where it is sealed by an externally located seal bushing 98. The return tube 92 has an inside diameter with close clearance fit to the diameter of the balls defining the pump pistons 86. Preferably the inner surface 100 of the return tube 92 is coated by Teflon to reduce friction therebetween while the close clearance fit between the outside diameter of the balls and the tube prevents leakage from individual ones of the pump spaces 90.

The opposite end 102 of the return tube 92 is directed to a bore 104 in a rectangularly configured plate 106 having a rectangular opening 108 which is filled by coal from the outlet funnel 14. The opening 108 is closed by a cover 110 secured thereto by screws 112. The return tube end 102 is tightly fit against one end of a fill channel 114 in the form of a trough of like diameter to the diameter of the opposite end 102 and including a fill opening 116 throughout its length within the opening 108 so that the powdered coal from the outlet funnel 14 will be directly passed into the conveyor at the fill channel 114 throughout the length of opening 108 so that there will be a first pass filling of the continuous loop conveyor 20. The outlet of the fill channel member 114 is received in a bore 118 at the opposite end of the plate 106 as seen in FIG. 2 and guides the conveyor 26 around the outer periphery of a driven sprocket 120 having spaced teeth 122 on the outer circumference thereof. The sprocket is connected to an idler shaft 124 having opposite ends thereof aligned within bores 126, 128 in housing parts 130, 132 held together by screws 134 so as to form a return path 136 for directing the conveyor 26 to a second fill station of the dual fill inlet 18 which is defined by a fill channel 138 like channel 114. It has its opposite ends received in bores 140, 142 formed in the plate 106 and is located adjacent a side wall 144 of the plate to be filled by powdered coal from the outlet funnel 14 on the opposite side of the fill opening 118. The fill channel 138 has an inlet opening 146 throughout its length so that it will be refilled with powdered coal to make up for any voids in the spaces 90 that were not filled at the first fill pass produced in the fill channel member 114.

The coal filled conveyor 26 is then directed through a supply tube 148 having an inside diameter corresponding to that of the return tube 92. The supply tube likewise has a Teflon coated inner surface 150 to reduce friction between the coal filled conveyor 26 as it is directed through the supply tube 148. The supply tube 148 has its opposite ends connected within the bore 142 and an inlet bore 152 in an aerator housing 154. The connection between the supply tube 148 and the aerator housing 154 is sealed by an outer seal bushing 156 encircling the outside diameter of the supply tube 148 and securely held in place against the outer surface of the housing 154. The inlet bore 152 in the aerator housing 154 has a length such that several of the balls 86 are interposed between the seal bushing 156 and a pressurized chamber 158 within the aerator housing 154 so that pressure within the chamber 158 will be sealed by the close clearance fit between the diameter of the pump piston balls 86 and the wall of the inlet bore 152. The aerator housing 154 further includes a return bore 160 therein which will accommodate several of the balls to also define a sealed passage between the chamber 158 and the return path 162 which the chain conveyor takes around the drive sprocket 82.

The aerator housing has a plurality of jet aerators 164 that have pressure supplied through inlet tube 32 that can be supplied by pressure from the gasifier turbine of a gas turbine engine. The jet aerators 164 will blast powdered coal from the coal filled spaces 90 and will direct it through the pressurized chamber 158 to the nozzle 38 for passage into the combustor 46.

In one working embodiment the non-pressurized coal hopper 12 is filled with powdered coal having a size of from five to fifty microns which constitute a fuel reservoir for the fuel distribution system. The housing cover 110 at the base of the reservoir collects the powdered coal in the opening 108 which is a cavity on the order of from 6"×5". The cavity is kept filled by vibrating the walls of the coal hopper 12 with it being understood that the type of mechanism for driving the coal hopper 12 to assure passage of the fluidized coal from the outlet funnel 14 can take on several forms to accomplish the objectives of the present invention. In any event, the opening 108 has coal forced across the vertically inwardly sloping sides of the funnel 14 to be directed into both passes of the dual fill inlet 18 previously described. In each case the balls forming the pump pistons on the cable have a diameter on the order of ⅜" which will pass through the opening 108 at the fill openings 116 and 146 of the channel members 114 and 138, respectively. Thus, two passes for picking up coal from the opening 118 are defined. On the second pass through the cavity the fill channel member 138 guides the coal filled spaces 90 into the constraint of the supply transport tube 148. The rate of rotation of the drive sprocket 82 will determine the number of coal filled spaces which will be directed across the jet aerators 164 and will thereby establish the amount of coal to be directed into the combustor 46 so that the system serves a controllable metering function. In the working embodiment a distance of approximately twenty inches was selected between the hopper and the fluidizer 28 to enable the conveyor system to be located within engine compartments of automotive type vehicles. The distance between the coal hopper and the aerator or fluidizer will vary in accordance with the installation. However, the location of the fluidizer 28 must be closely proximate to the nozzle 38 so that the aerated and fluidized coal will be maintained in that state without separation from the high velocity carrying air. In any case, the configuration of the tubes in the conveyor system can be varied and curved to direct the coal from the coal hopper 12 to the fluidizer 28. The form of the conveyor is such that coal flow is not dependent upon gravity for movement.

As the ball cable conveyor 26 transports the coal fill spaces into the discharge manifold of a fluidizer 28, the diametral clearance over the balls is very small on the order of 0.001" to 0.003" and it is preferred that at least three ball pitches be located within each of the inlet and outlet bores 152, 160 to the pressurized chamber to prevent leakage of high pressure gas from the system. This is especially important in cases of automotive vehicles where compressor discharge pressure from the gasifier of the engine can affect engine performance characteristics. Excessive loss of pressure at the conveyor system can produce a loss of engine operating efficiency. Alternatively, if positive sealing is desired, a positive lip-type seal can be employed at the inlet and outlet of the ball chain conveyors from the aerator housing 154.

In the illustrated arrangement, coal discharge within the aerator housing 154 is accomplished with a series of four pressurized, 1/16" diameter jet aerators blasting at the spaces 90 between the balls 86 to remove the coal fill therefrom. As the ball chain passes through the pressurized chamber 158, the coal will be removed and directed into a high turbulent air pressure fluidized state to flow through the outlet or connection tube 54 to the nozzle. Following passage from the fluidizer 28, the ball chain has delivered a supply of coal and returns around the drive sprocket back to the reservoir opening 108. The drive sprocket 82 is variably driven by a suitable drive mechanism. The fuel flow rate to the nozzle 38 is controlled by varying the RPM of the drive mechanism which governs the velocity of advance of the chain conveyor 26 through the previously described conveyor circuit. In the illustrated arrangement only the pressurized chamber 158 of the aerator housing is maintained under pressure and the remaining parts of the delivery system are maintained substantially at atmospheric pressure. Since the remainder of the system is maintained under atmospheric conditions, it reduces seal complications and makes it more suitable for use in a mobile system having a limited source of gas pressure.

While a ball cable system is illustrated, it should be understood that other shapes of the type set forth in the remaining embodiments are suitable for use in the present invention. The size in voids between the geometric shapes of the links and pump piston components of the chain conveyor 26 will determine the degree of pumping capacity of the unit. In the illustrated arrangement, the unit has a capacity of pumping powdered coal from a minimum of three pounds per hour to a maximum of 130 pounds per hour utilizing a ⅜" diameter ball with a ball pitch of 0.50 inches. As previously mentioned, friction can be kept at a minimum by coating the interior surfaces of the return tube 92 and the supply transport tube 148. To keep the powdered coal from settling while flowing in the fuel supply or connection line or tube 54, the nozzle length of the tube should be short and if not, a boost swirl manifold must be used as set forth in the aforedescribed United States Ser. No. 125,469.

Figure 4:
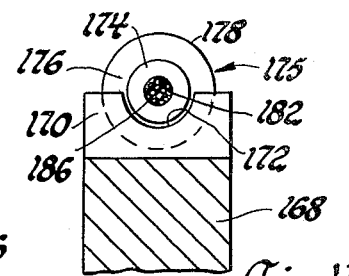
FIG. 4 is a sectional view taken along the line 4—4 of FIG. 3 looking in the direction of the arrows.

Referring now to the embodiment of the invention illustrated in FIGS. 3 and 4, a fragment of a drive sprocket 168 is illustrated including teeth 170 thereon with outer grooves 172 formed therein to fit around the tip 174 of a pump piston 175 having a cone 176 with a circular outside surface 178 formed thereon of a diameter closely spaced with respect to the inside surface of transport tubes of the type previously described. In this arrangement, each of the pump pistons are spaced from an adjacent piston by a cylindrical bead 180 and each of the members are conformed to have a connector bore 182, 184 formed therein through which a drive cable 186 of continuous configuration is threaded to secure the component parts of the cable together.

In the illustrated arrangement, the sprocket 168 will drive the pump pistons so that an upstream surface 188 thereon will act to draw a fill of coal into an annular space 190 formed between each of the pistons 175 and the outer surface of the spacer beads 180. The spaces 190 define the coal capacity of individual ones of a plurality of pockets of the resultant continuously formed cable conveyor.

Figure 5:
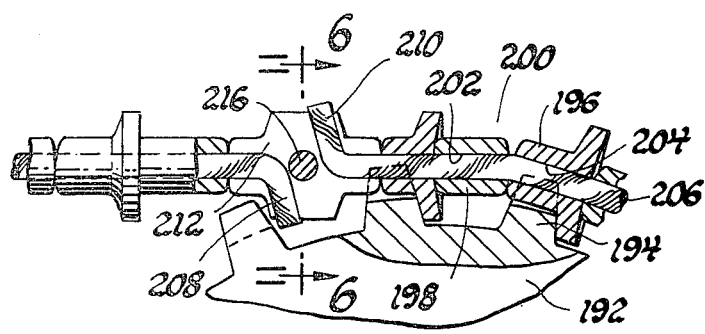
FIG. 5 is a further embodiment of a drive sprocket and cable of the present invention.
Figure 6:
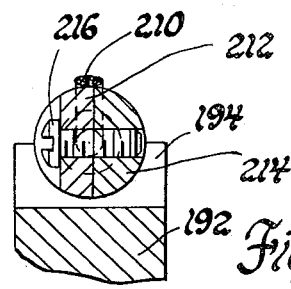
FIG. 6 is a sectional view taken along the line 6—6 of FIG. 5.

In the embodiment illustrated in FIGS. 5–6, a sprocket 192 having outwardly located grooved teeth 194 thereon are arranged to engage pump pistons 196 which are spaced apart by spacer beads 198 to form coal fill cavities 200. In this arrangement each of the spacer beads and pump pistons have bores 202, 204 formed therethrough through which a cable 206 is threaded. In the illustrated arrangement, the cable has opposite ends 208, 210 thereon directed to either side of a pair of generally cross configured connector plates 212, 214 held together by a fastening screw 216.

Figure 7:
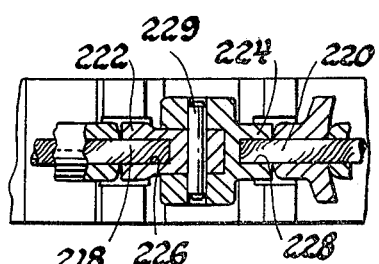
FIG. 7 is a sectional view of another embodiment of a drive sprocket and cable.

The embodiment of FIG. 7 shows a further embodiment of a connector between ends 218, 220 of a continuous cable that may be used in conjunction with the piston and spacer beads of the embodiments in FIGS. 3–5. In this arrangement the cable ends 218, 220 are received respectively in a connector grommet 222 and a cross head connector member 224 at bores 226, 228 therein, respectively. The crosshead 224 is pinned to the member 222 by means of a cross connector pin 229.

Figure 8:
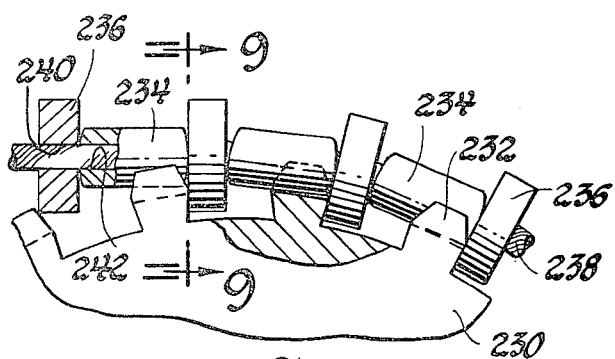
FIG. 8 is a further embodiment of the present invention showing an enlarged fragmentary view of a sprocket and modified cable thereon.
Figure 9:
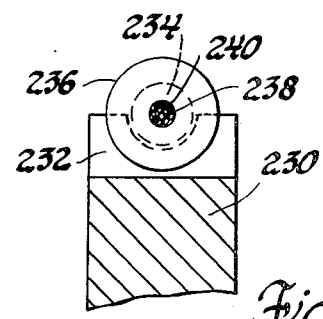
FIG. 9 is a sectional view taken along the line 9—9 of FIG. 8.

The embodiments in FIGS. 8 and 9 include a sprocket 230 having groove teeth 232 thereon that engage spacer beads 234 that space cylindrically formed pumping pistons 236 all of which are joined by a continuously formed cable 238 directed through an internal bore 240 of the cylinder 236 and an internal bore 242 in each of the beads.

Figure 10:
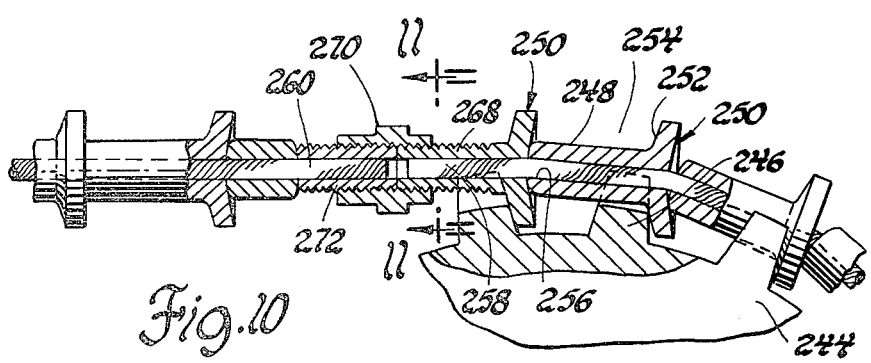
FIG. 10 is yet another embodiment of a sprocket and cable shown in an enlarged and fragmentary view and having component parts thereof in section.
Figure 11:
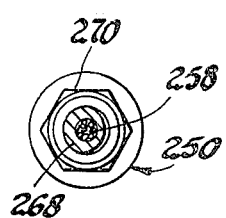
FIG. 11 is a sectional view taken along the line 11—11 of FIG. 10 looking in the direction of the arrows.

The embodiment in FIGS. 10 and 11 shows still a further variation of a pump piston and cable connector system. It includes a sprocket 244 having groove teeth 246 joined to an extended length end 248 on a pumping piston 250 having a cone end 252 like that in the embodiments of FIGS. 3 and 5. In this arrangement, the extension 248 itself constitutes the means defining the extent of the coal filled space 254 that determines the capacity of the pump. A bore 256 through each of the pumping pistons has a cable threaded therethrough with spaced ends 258, 260 thereon received respectively in coupling members including a threaded end 268 on one of the pumping pistons 250 which is threaded into a fastening coupling 270 that is internally threaded to couple the threaded end 268 to an externally threaded spacer 272.

While the embodiments of the present invention, as herein disclosed, constitute a preferred form, it is to be understood that other forms might be adopted.

The embodiments of the invention in which an exclusive property or privilege is claimed are defined as follows:

1. A gas turbine engine fuel supply system to direct coal powder to a fuel nozzle in a gas turbine engine combustor comprising: reservoir means maintained at atmospheric pressure and including an outlet, a fill cavity, means for continuously filling said cavity with coal powder from said reservoir means, discharge manifold means, coal transport tube means with an inside diameter for defining a continuous loop, coal dust tight, flow path between said fill cavity and said discharge manifold means, conveyor means having interconnected pistons with voids therebetween continuously formed through said coal dust tight flow path, variable speed drive means operative to drive said pistons through said fill cavity for filling said voids with coal powder from said cavity and to meter coal to said discharge manifold means, said conveyor means having a cable loop, said pistons being strung on said cable and including a small diameter segment and a segment of a diameter corresponding to the inside diameter of said tube means to define said voids and to seal between said voids, said discharge manifold means having a conveyor inlet passage and a conveyor outlet passage, means for sealing said conveyor inlet passage and said conveyor outlet passage, a discharge chamber within said discharge manifold means, said chamber having an inlet and an outlet, means for defining a plurality of air jets in said discharge chamber inlet for blasting high pressure air across said conveyor means to discharge coal powder from said voids to produce a fluidized coal powder mixture and to maintain an inlet pressure at said discharge chamber for directing said fluidized coal powder through the outlet from said chamber to a fuel nozzle in a gas turbine engine combustor.

2. A gas turbine engine fuel supply system to direct coal powder to a fuel nozzle in a gas turbine engine combustor comprising: reservoir means maintained at atmospheric pressure and including an outlet, a fill cavity, means for continuously filling said cavity with coal powder from said reservoir means, discharge manifold means, coal transport tube means for defining a continuous loop, coal dust tight, flow path between said fill cavity and said discharge manifold means, said tube means including two spaced, parallel channel members with fill openings in communication with said fill cavity, conveyor means having interconnected pistons with voids therebetween continuously formed through said coal dust tight flow path, variable speed drive means operative to drive said pistons through said parallel channel members for filling said voids with coal powder from said cavity and to meter coal to said discharge manifold means, said conveyor means having a cable loop, said pistons being strung on said cable and including a small diameter segment and a segment of a diameter corresponding to the inside diameter of said tube means to define said voids and to seal between said voids, said discharge manifold means having a conveyor inlet passage and a conveyor outlet passage, means for sealing said conveyor inlet passage and said conveyor outlet passage, a discharge chamber within said discharge manifold means, said chamber having an inlet and an outlet, means for defining a plurality of air jets in said discharge chamber inlet for blasting high pressure air across said conveyor means to discharge coal powder from said voids to produce a fluidized coal powder mixture and to maintain an inlet pressure at said discharge chamber for directing said fluidized coal powder through the outlet from said chamber to a fuel nozzle in a gas turbine engine combustor.

* * * * *